United States Patent
Iwai et al.

[11] Patent Number: 5,308,479
[45] Date of Patent: May 3, 1994

[54] SEWAGE DISPOSAL APPARATUS EMPLOYING CIRCULATING FILTER MEDIA

[76] Inventors: Isamu Iwai, 12-14, Shimosueyoshi 1-chome, Tsurumi-ku, Yokohama-shi, Kanagawa-ken 230; Chikatsu Nirasawa, 13-7, Bunka 1-chome, Sumida-ku, Tokyo 131, both of Japan

[21] Appl. No.: 8,389

[22] Filed: Jan. 25, 1993

Related U.S. Application Data

[63] Continuation of Ser. No. 646,733, Jan. 3, 1991, abandoned.

[30] Foreign Application Priority Data

May 26, 1989 [JP] Japan .................. 1-134314

[51] Int. Cl.$^5$ ............................................ C02F 3/08
[52] U.S. Cl. ................................. 210/151; 210/197; 210/216; 210/532.2
[58] Field of Search ................ 210/616-618, 210/786, 150, 532.2, 151, 197, 216, 220

[56] References Cited

U.S. PATENT DOCUMENTS

| | | | |
|---|---|---|---|
| 2,071,591 | 2/1937 | Tholin | 210/616 |
| 4,707,252 | 11/1987 | Durot et al. | 210/618 |
| 4,931,183 | 6/1990 | Klein et al. | 210/617 |
| 4,931,401 | 6/1990 | Safi | 210/616 |
| 5,202,029 | 4/1993 | Stuth | 210/197 |

FOREIGN PATENT DOCUMENTS

| | | |
|---|---|---|
| 57-132592 | 8/1982 | Japan . |
| 61-2440 | 1/1986 | Japan . |
| 62-42799 | 11/1987 | Japan . |
| 62-44799 | 11/1987 | Japan . |
| 62-262794 | 11/1987 | Japan . |
| 63-40597 | 8/1988 | Japan . |
| 1370091 | 6/1986 | U.S.S.R. .......... C02F 3/12 |
| 1373694 | 7/1986 | U.S.S.R. .......... C02F 3/02 |

*Primary Examiner*—Thomas Wyse
*Attorney, Agent, or Firm*—McGlew & Tuttle

[57] ABSTRACT

The present invention relates to a sewage disposal method employing a filter media and an apparatus for carrying out the same intended for the effective prevention of the clogging of the filter media. Sewage currents are generated in a circulation passage means defined in a septic tank by a sewage current generating means to circulate the filter media regularly and continuously through the circulation passage means by the sewage currents. Sludge can be removed from the filter media by regularly circulating the filter media without dispersing the sludge in the septic tank.

13 Claims, 7 Drawing Sheets

SEWAGE DISPOSAL APPARATUS EMPLOYING CIRCULATING FILTER MEDIA

This is a file wrapper continuation of application Ser. No. 07/646,733 filed Jan. 3, 1991, abandoned.

DESCRIPTION

1. Technical Field

The present invention relates to improvements in a sewage disposal method employing a filter system, and an apparatus for carrying out the same.

2. Background Art

A sewage disposal method employing a filter system purifies sewage by the bacterial action of aerobic bacteria or anaerobic bacteria incubated in a filter bed formed by assembling a plurality of filter media in a septic tank.

This sewage disposal method, however, has a problem that the purifying ability of the apparatus is deteriorated by sludge that clogs the filter media, hence, the filter bed. In this description, the term "sludge" refers to various solids separated from sewage.

A conventional method to solve such a problem employs filter media which does not easily clog and another conventional method employs a preparatory sewage disposal process to reduce the sludge concentration of sewage and treats the diluted sewage for final sewage disposal.

The conventional method employing a preparatory sewage disposal process requires considerably troublesome work for preparatory sewage disposal and, even if the sludge concentration of sewage is reduced by the preparatory sewage disposal process, the filter bed is clogged unavoidably with sludge and, eventually, the filter media must be replaced with new ones or cleaned periodically, which requires troublesome, heavy work.

Various improved filter media have been proposed. Japanese Patent No. 1343032 (Japanese Patent Publication (Kokoku) No. 61-2440) discloses a buoyant, spherical filter medium hard to entangle itself with other ones. Although fairly satisfactory in ability to suppress clogging, even this filter medium is unable to prevent clogging.

The present invention has been made in view of such problems in the prior art, and it is therefore an object of the present invention to provide a sewage disposal method capable of effectively preventing the clogging of filter medium and of always enabling efficient sewage disposal, and to provide an apparatus for carrying out the sewage disposal method.

DISCLOSURE OF THE INVENTION

The object of the invention can be achieved by a sewage disposal method employing a circulating filter system, comprising forming sewage currents by sewage current generating means in a circulation passage formed for circulating filter media in a septic tank by partitioning the interior of the septic tank, and circulating the filter media through the circulation passage.

This method has been developed on the basis of knowledge that although continuously moving the filter media prevents the clogging of the filter media effectively, simple, confused movement of the filter media disperses sludge fallen off the filter media in the septic tank, deteriorating the sewage purifying efficiency. The method in accordance with the present invention efficiently makes the filter media move continuously and regularly to prevent the clogging of the filter media effectively for continuous, efficient sewage purification.

This method is carried out by a circulating filter type sewage disposal apparatus having a septic tank provided with a circulation passage formed by partitioning the interior thereof, and sewage current generating means provided on one end of the circulation passage.

In carrying out the method, the circulation passage may be defined by a tubular member having open opposite ends and disposed in a vertical position. This method is advantageous in that sludge fallen off the filter media can be easily disposed of. This method is carried out by a circulating filter type sewage disposal apparatus employing a tubular member having open opposite ends and defining a vertical circulation passage. The method is carried out also by a circulating filter type sewage disposal apparatus provided with a sludge settling pit formed below a circulation passage.

The method employing the vertical circulation passage is able to generate sewage currents through the circulation passage by the agency of the buoyancy of bubbles supplied through the lower end of the circulation passage into the same and to remove sludge efficiently from the filter media by vibrations applied to the filter media by the bubbles. Thus, the method is able to achieve both generating sewage currents and removing sludge from the filter media. This method is carried out by a circulating filter type sewage disposal apparatus capable of supplying bubbles through the lower end of a circulation passage into the same so that the bubbles rise through the circulation passages to generate sewage currents by the agency of their buoyancy.

Furthermore, the method can be carried out by forming a lateral circulation passage by a plurality of partition walls set in a septic tank and forming sewage currents in the circulation passage in a direction reverse to the flowing direction of the sewage. This method is particularly suitable for application to the large-scale purification of river water. This method is carried out by a circulating filter type sewage disposal apparatus having a septic tank provided with a plurality of partition walls arranged in the septic tank so as to form a lateral circulation passage in which sewage currents are generated in a direction reverse to the flowing direction of the sewage.

This method may employ a single lateral circulation passage formed in the central portion of the septic tank or may employ a pair of lateral circulation passages formed respectively along the opposite side walls of the septic tank. This method is carried out by a circulating filter type sewage disposal apparatus having a septic tank provided with a single lateral circulation passage in the central portion thereof or a circulating filter type sewage disposal apparatus having a septic tank provided with a pair of lateral circulation passages formed respectively along the opposite side walls thereof. To remove sludge efficiently from the filter media and to dispose of the sludge efficiently, it is possible to employ a circulating filter type sewage disposal apparatus provided with vibrating means for vibrating the filter media in a circulation passage or passages, and a sludge settling pit disposed after the vibrating means with respect to the flowing direction of the sewage currents at a predetermined distance from the vibrating means.

BEST MODE FOR CARRYING OUT THE INVENTION

Preferred embodiments of the present invention will be described hereinafter with reference to the accompanying drawings, in which like or corresponding parts denoted by the same reference characters throughout and the duplicate description thereof will be omitted.

Although the invention will be described as applied to circulating filter type sewage disposal apparatus of aeration type, the present invention is not limited thereto in its application, but may be applied to those of an anaerobic type.

First Embodiment

Figure 1:
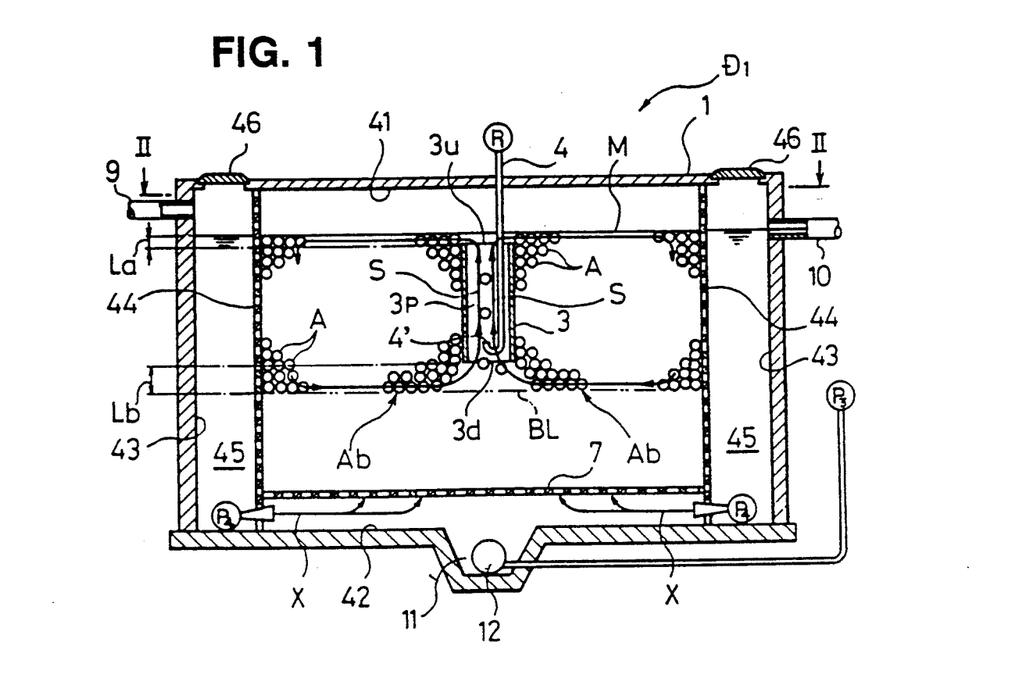
FIG. 1 is a schematic sectional view of a circulating filter type sewage disposal apparatus in a first embodiment according to the present invention.
Figure 2:
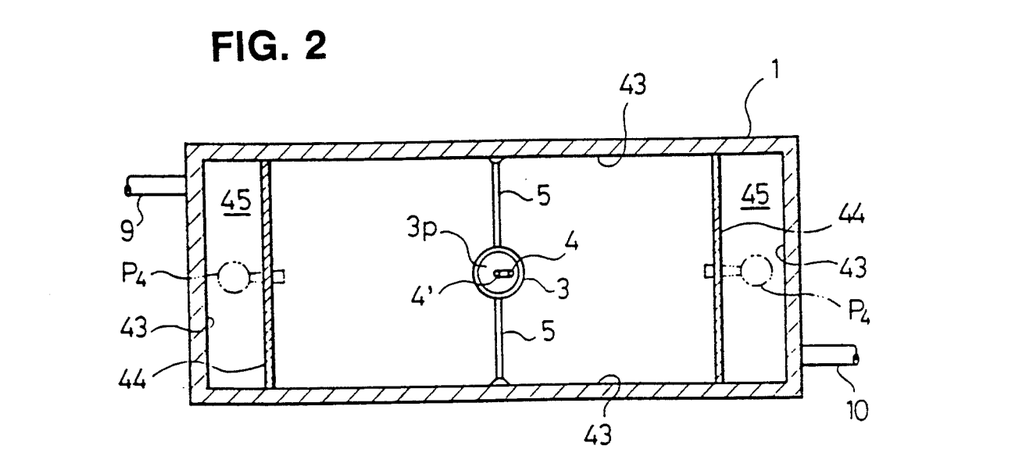
FIG. 2 is a schematic sectional view taken on line II—II in FIG. 1.

As shown in FIGS. 1 and 2, a circulating filter type sewage disposal apparatus D1 in a first embodiment according to the present invention has a septic tank 1 provided with a circulation passage $3p$ along which filter media A are circulated.

The filter media A, as will be obvious from the description below, must be buoyant ones having a specific gravity in the range of 0.95 to 0.98, which is slightly smaller than that of the sewage, and an appropriate buoyancy, capable of floating in the sewage, and hard to entangle themselves with each other. The spherical filter medium disclosed in Japanese Patent No. 1343032 (Japanese Patent Publication (Kokoku) No. 61-2440) is an optimum filter medium having such characteristics.

When filled in the septic tank 1, the buoyant filter media A collect in a filter bed Ab being a group of filter media A under the surface M of the sewage. Aerobic bacteria propagate in the filter bed Ab to purify the sewage. Preferably, the filter media A are filled in the septic tank 1 in 55 to 60% by volume of the sewage.

The septic tank 1 is in a box form enclosed by broken lines of an upper wall 41, a bottom wall 42 and four side walls 43. A sewage supply pipe 9 and a treated water discharge pipe 10 are connected to the front side wall 43 and a rear side wall 43, respectively. A meshed or latticed bottom plate 7 is disposed slightly above the bottom wall 42 so as to keep the filter media A away therefrom when the septic tank 1 is drained of the sewage.

The circulation passage $3p$ is defined by a tube 3 having opposite open ends $3u$ and $3d$, and suspended in the septic tank 1 in a vertical position with the upper end $3u$ submerged at a distance La from the surface M and with the lower end $3d$ a distance Lb above the bottom line BL of the filter bed Ab. Preferably, the inside diameter of the tube 3 and the distance Lb are twice the diameter of the filter media A or greater, and the distance La is equal to or greater than the diameter of the filter media A to secure the smooth circulation of the filter media A. The tube 3 may be either a circular tube or a square tube.

An air injection pipe 4 for injecting air into the sewage is inserted in the circulation passage $3p$ with its nozzle 4 disposed in the lower portion of the circulation passage $3p$.

A sludge settling pit 11 is formed below the circulation passage $3p$ in the bottom wall 42. The sludge accumulated in the pit 11 is discharged by a suction unit 12 connected to a pump P3.

Diffusion pumps P4 disposed in the opposite lower ends of the septic tank 1 supplies air for aeration and for urging the sludge precipitated in portions of the bottom wall 42 other than the pit 11 to collect the sludge in the pit 11.

The diffusion pumps P4 are disposed in maintenance spaces 45 formed by partitioning the interior of the septic tank 1 by partition walls 44. Manholes 46 are formed at the upper ends of the maintenance space 45, respectively.

The circulating filter type sewage disposal apparatus D1 thus constructed is able to prevent the clogging of the filter media A with sludge effectively by continuously circulating the filter media A.

Bubbles of air injected into the sewage by the air injection pipe 12 rise through the circulation passage $3p$ to generate sewage currents S continuously through the circulation passage $3p$ by the buoyancy of the bubbles in order that the filter media A are circulated continuously. More concretely, the buoyant filter media A collect under the surface M of the sewage having the bottom line BL, and a portion of the bottom line BL below the lower end $3d$ of the tube 3 is deformed in the shape of a funnel as the sewage currents are generated. Then, the filter media A floating along the funnel-shaped surface flow sequentially into the circulation passage $3p$, rise through the circulation passage $3p$ and flow out of the circulation passage $3p$ through the upper end $3u$ of the same. The filter media A floating on the surface M are dispensed by impulsive force generated by the bursting filter media A, and then the filter media A flow downward to the funnel-shaped bottom surface of the filter bed Ab. Thus, the filter bed Ab is caused to roll gradually in a manner like glacial movement by the sewage current S. The velocity of the sewage currents S can be optionally regulated by regulating air injection rate according to the sludge concentration of the sewage or the degree of purification. Experimental operation of the circulating filter type sewage disposal apparatus D1 for purifying sewage of an ordinary sludge concentration showed that the circulation of the filter media A at a rate of several filter media A per minute is sufficiently effective.

Furthermore, the circulating filter type sewage disposal apparatus D1 is capable of continuously and automatically removing sludge from the filter media A and of efficiently recovering the sludge removed from the filter media A without allowing the sludge to disperse in the septic tank 1.

Concretely, the bubbles formed by injecting air into the circulation passage 3p generate the sewage currents and, at the same time, applies intensive vibrations to the filter media A flowing together with the sewage currents, whereby sludge is removed efficiently from the filter media A. The sludge thus removed from the filter media A in the circulation passage 3p is prevented from dispersing in the septic tank 1 by the tube 3 defining the circulation passage 3p and, consequently, the sludge precipitates and settles in the pit 11. The suction unit 12 discharges the sludge settled in the pit 11.

A small portion of the sludge adhering to the filter media A falls off the filter media A in regions outside the circulation passage 3p as well as from those flowing through the circulation passage 3p, and sludge contained in the sewage precipitates directly. Sludge settled in areas on the bottom wall 42 other than an area forming the pit 11 is gathered in the pit 11 by the diffusion pumps P4 and is discharged by the suction unit 12.

Second Embodiment

Figure 3:
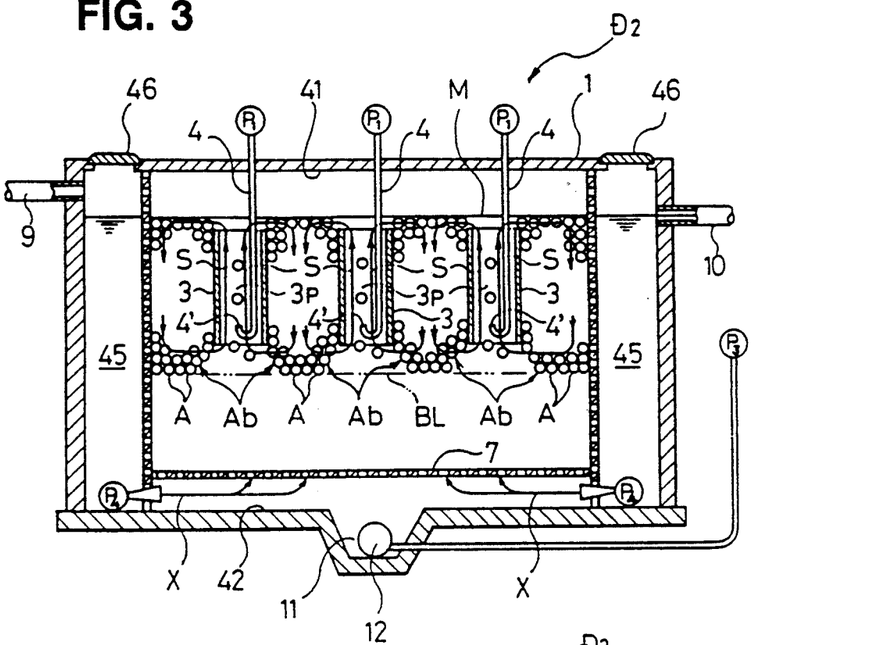
FIG. 3 is a schematic sectional view of a circulating filter type sewage disposal apparatus in a second embodiment according to the present invention.

A circulating filter type sewage disposal apparatus D2 in a second embodiment according to the present invention shown in FIG. 3 is substantially the same in construction as the circulating filter type sewage disposal apparatus D1 in the first embodiment, except that the circulating filter type sewage disposal apparatus D2 is provided with a plurality of circulation passages 3p.

Third Embodiment

Figure 4:
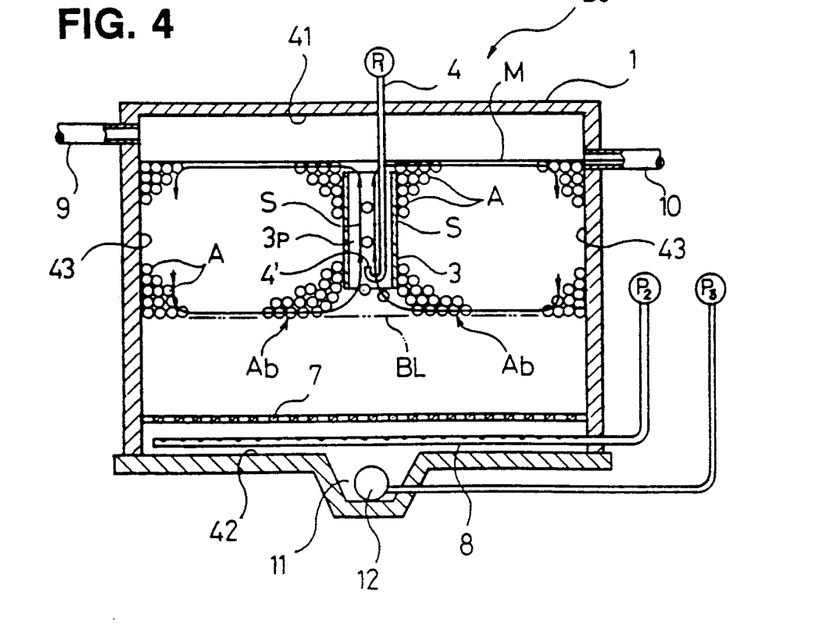
FIG. 4 is a schematic sectional view of a circulating filter type sewage disposal apparatus in a third embodiment according to the present invention.

A circulating filter type sewage disposal apparatus D3 in a third embodiment according to the present invention shown in FIG. 4 is substantially the same in construction as the circulating filter type sewage disposal apparatus in the first embodiment, except that the circulating filter type sewage disposal apparatus D3 employs diffusion pipes 8 instead of the diffusion pumps P4 of the first embodiment, and is not provided with the partition walls 44 defining the maintenance spaces 45, and the manholes 46.

Fourth Embodiment

Figure 9:
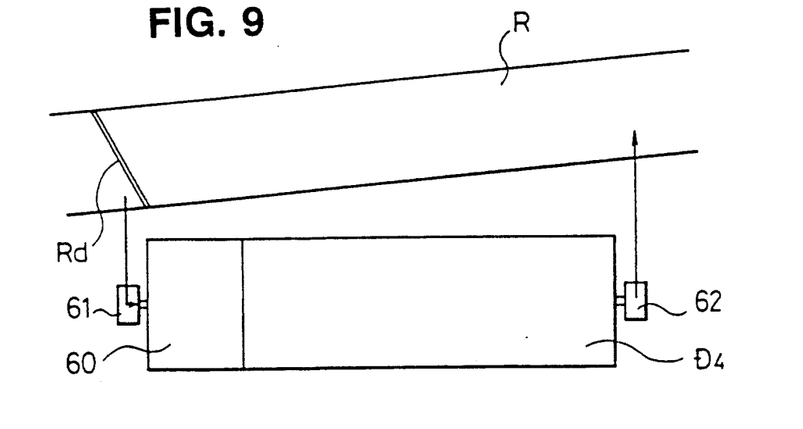
FIG. 9 is a schematic plan view showing the disposition of the circulating filter type sewage disposal apparatus in a fourth embodiment according to the present invention.
Figure 10:
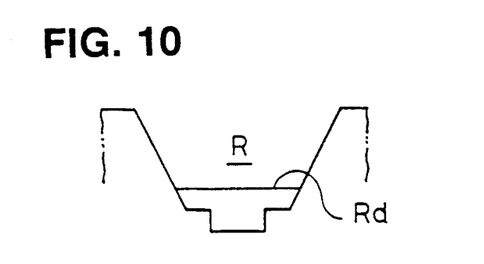
FIG. 10 is a diagrammatic sectional view of a river.

A circulating filter type sewage disposal apparatus D4 in a fourth embodiment according to the present invention is suitable for installation near a river R as shown in FIG. 9 for the large-scale purification of river water.

Figure 6:
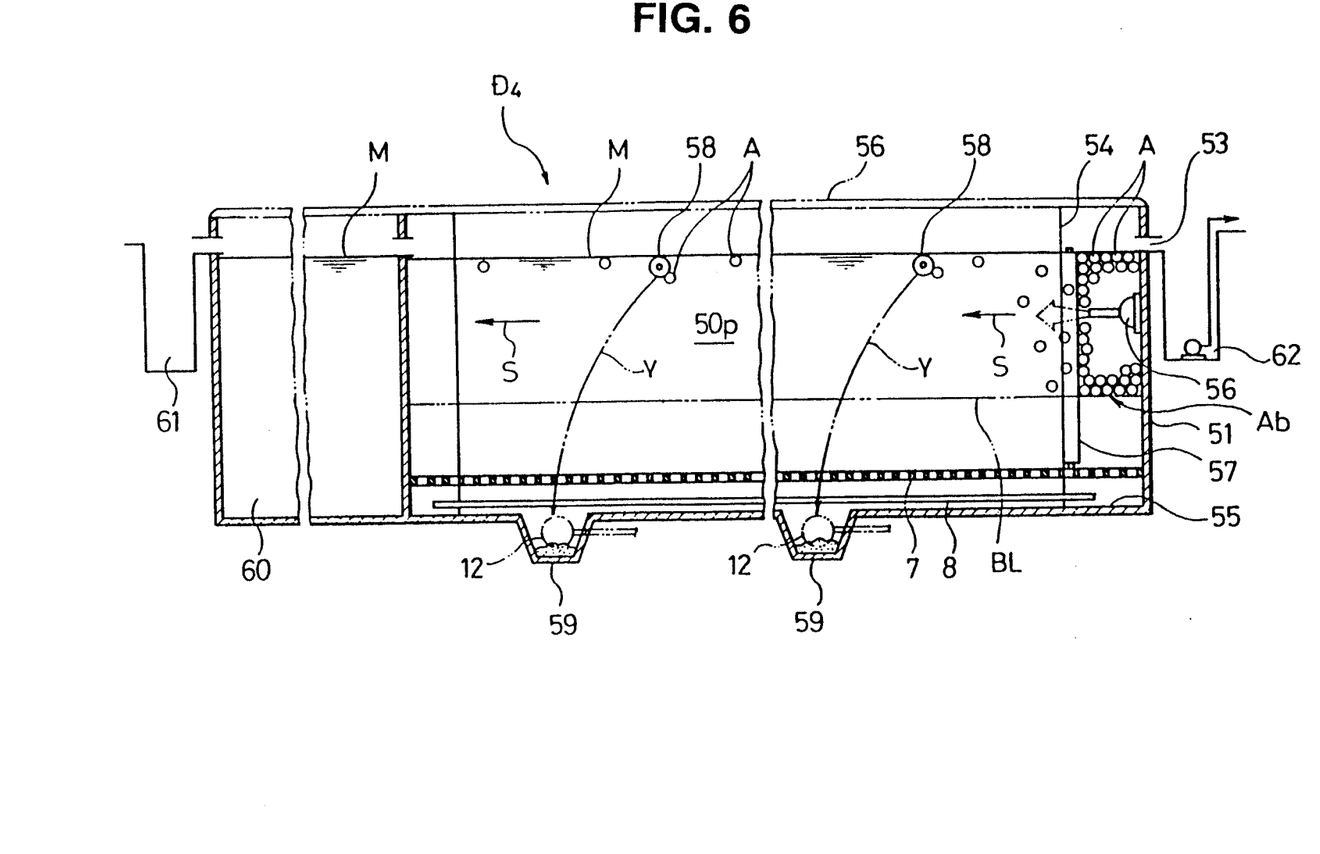
FIG. 6 is a schematic sectional view taken on line VI—VI in FIG. 5.
Figure 7:
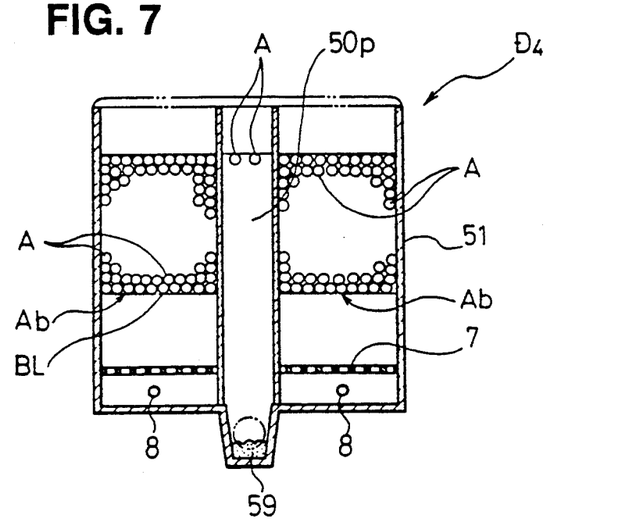
FIG. 7 is a schematic sectional view taken on line VII—VII in FIG. 5.
Figure 8:
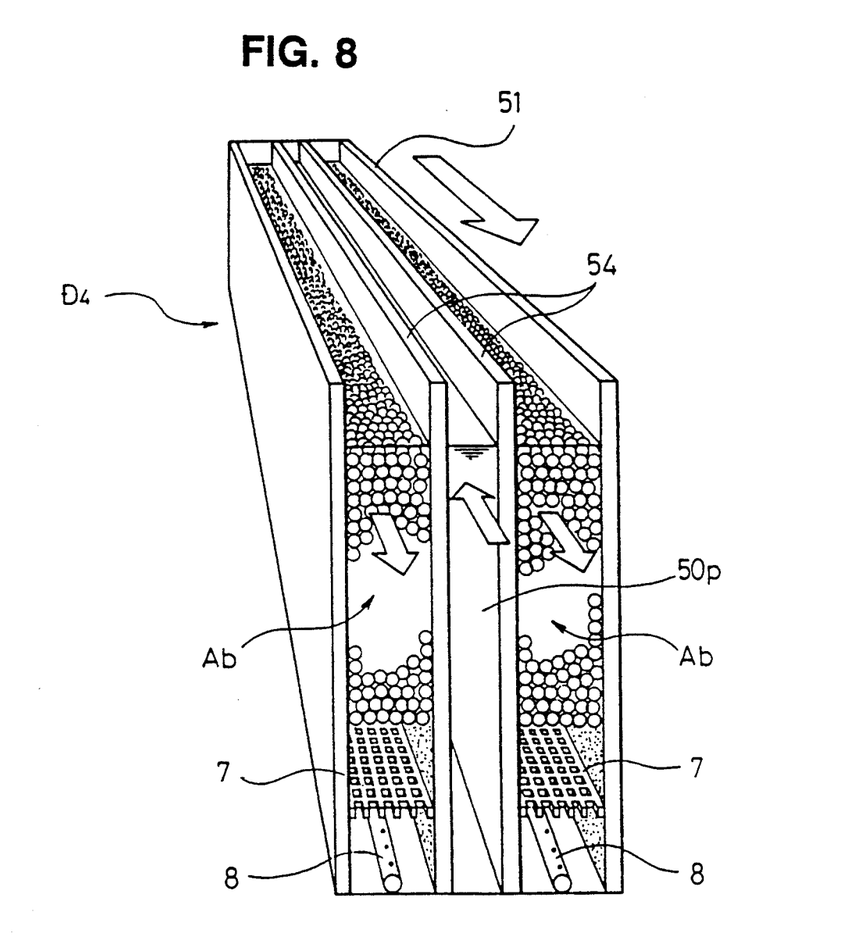
FIG. 8 is a schematic perspective view of the circulating filter type sewage disposal apparatus in a fourth embodiment according to the present invention.

Concretely, the circulating filter type sewage disposal apparatus D4 is provided with a horizontal circulation passage 50P instead of the vertical circulation passage 3p of the circulating filter type sewage disposal apparatus D1 in the first embodiment. The circulation passage 50P is defined by a pair of parallel partition walls 54 set in a septic tank 51 along the flowing direction of the sewage, which flows into the septic tank 51 through a sewage inlet 52 and flows toward a purified water outlet 53 (FIG. 6).

Figure 5:
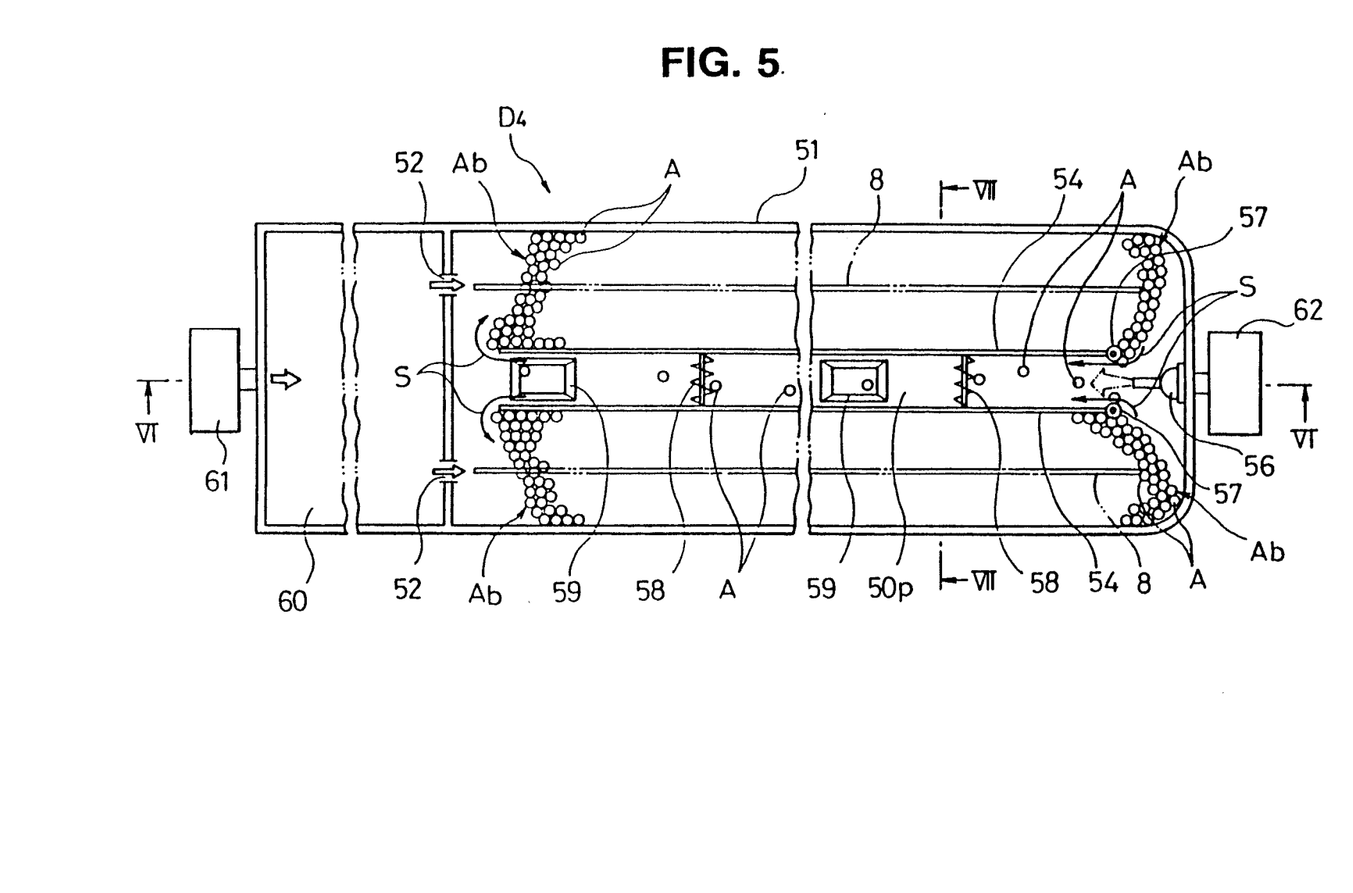
FIG. 5 is a schematic plan view of a circulating filter type sewage disposal apparatus in a fourth embodiment according to the present invention.

The partition walls 54 extend between the bottom wall 55 and top wall 56 of the septic tank 51 so as to separate the circulation passage 50P formed in the central portion of the septic tank 51 completely from the other portions of the interior of the septic tank 51.

Water currents S flowing reverse to the flow of the sewage is formed in the circulation passage 50P by sewage current generating means 56 to circulate filter media A together with the sewage currents S. The filter media A that flow together with the sewage currents S form a fluidic filter bed Ab similar to that of the first embodiment. The circulation velocity of the filter media A is determined according to the condition of the sewage and process conditions. Ordinarily, an appropriate circulation velocity is such that makes the filter media A circulate through the circulation passage 50P once a week or a month.

A pair of rotary guides 57 are disposed oppositely at the inlet of the circulation passage 50P to guide the filter media A into the circulation passage 50P.

Vibrating means 58 are arranged at appropriate intervals in the circulation passage 50P to vibrate the filter media A, and sludge settling pits 59 are disposed in the circulation passage 50P a predetermined distance downstream the vibrating means 58 with respect to the direction of the sewage currents in combination with the vibrating means 58, respectively. The sludge settling pits 59 are separated the predetermined distance apart from the vibrating means 58, respectively, because sludge removed from the filter media A is caused to flow downstream by the sewage currents and precipitates along paths indicated at Y in FIG. 6. The sludge settled in the pits 59 is discharged by the same manner as that employed in the first embodiment.

Since the sludge is removed from the filter media A in specific regions in the circulation passage 50P separated from the other portions of the interior of the septic tank, the sludge can be efficiently removed from the filter media A without dispersing the sludge in the entire interior of the septic tank, which further enhances clogging preventing effect and sewage disposal efficiency.

A settling tank 60 is disposed on the sewage inlet side of the circulating filter type sewage disposal apparatus D4 to supply the sewage to the circulating filter type sewage disposal apparatus D4 after removing large contaminants unsuitable for filtration contained in the sewage. An intake pit 61 is disposed before the settling tank 60 to supply the river water diverted by a weir Rd constructed in the rivet R through the intake pit 61 to the settling tank 60. A discharge pint 62 is provided on the side of the purified water outlet 53 of the circulating filter type sewage disposal apparatus D4 to return purified water to the river R through the discharge pit 62.

Fifth Embodiment

Figure 11:
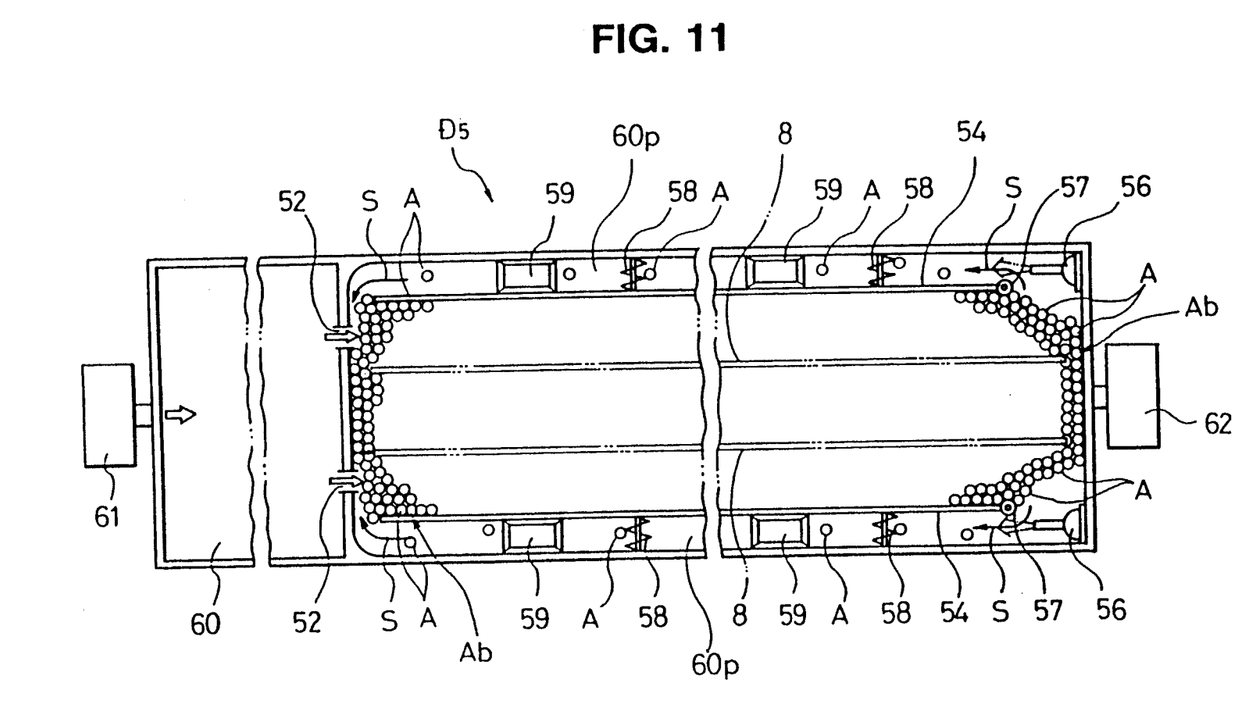
FIG. 11 is a schematic plan view of a circulating filter type sewage disposal apparatus in a fifth embodiment according to the present invention.

A circulating filter type sewage disposal apparatus D5 in a fifth embodiment according to the present invention is a modified embodiment of the fourth embodiment and is substantially the same in construction as the circulating filter type sewage disposal apparatus D4, except that the circulating filter type sewage disposal apparatus D5 is provided with the pair of circulation passages 60P similar to the circulation passage 50P along the opposite side walls, respectively, of a septic tank 51.

CAPABILITY OF EXPLOITATION IN INDUSTRY

The circulating filter type sewage disposal apparatus in accordance with the present invention generates sewage currents in a circulation passage (or passages) formed by partitioning the interior of the septic tank by current generating means to circulate the filter media regularly and continuously through the circulation passage (or passages) so that the clogging of the filter media can be effectively prevented. The regular circulation of the filter media enables continuously removing sludge from the filter media without dispersing the sludge in the septic tank, which improves the efficiency of sewage purification by filtration remarkably.

We claim:

1. A circulating filter type sewage disposal apparatus, comprising:
    means defining a septic tank including an inflow connection and an outflow connection;
    partition wall means positioned within said septic tank, said partition wall means having openings allowing sewage to flow there through, said openings having an opening dimension preventing elements larger than said opening dimension from flowing through;
    a group of buoyant filter media dimensioned larger than said opening dimension, each of said filter media being in contact with the adjacent filter media to form a filter media body, said filter media body having an upper extent at a fluid surface level and having a lower extent and having sides conforming to walls of said septic tank and conforming to said partition means wherein adjacent filter media are maintained in substantially fixed relative position between said walls and on one side of said partition means;
    circulation passage means including a tube extending through said filter media body from a tube intake end wherein said filter media body surrounds said intake end and said filter media body extends below said intake end in a direction away from said intake end, to a discharge end wherein said filter media body surrounds said discharge end and said filter media body extends above said discharge end in a direction away from said discharge end, said tube isolating said circulation passage from said filter media body, said circulation passage means for providing communication between the interior of said filter media body adjacent one end of said filter media body and the interior of said filter media body adjacent another end of said filter media body; and,
    sewage current generating means for generating flow current within said circulating passage for breaking individual ones of said filter media from said interior of said filter media body adjacent said intake end said filter media body having a remainder portion not adjacent said intake end, said remainder portion being maintained with individual filter media substantially static with respect to each other so as to not disturb mater adhered to said remainder portion, said sewage current generating means propelling said individual ones of said filter media from said intake end of said circulation passage means to said discharge end of said circulation passage means and freeing matter adhered to said individual one of said filter media and for urging said individual ones of said filter media into engagement with said interior of said filter media body adjacent said discharge end to join said individual ones of said filter media with said remainder portion of said filter media body.

2. A circulating filter type sewage disposal apparatus, comprising:
    means defining a septic tank including a sewage inflow connection for directing sewage into the septic tank and an outflow connection;
    partition wall means positioned within said septic tank, said partition wall means having openings allowing sewage to flow there through, said openings having an opening dimension preventing elements larger than said opening dimension from flowing through;
    a group of buoyant larger filter media, larger than said opening dimension each of said filter media being in contact with adjacent filter media to form a filter media body on one side of said partition wall means, said filter media extending from a first end to a second end;
    circulation passage means extending through said filter media body from a circulation passage intake end wherein said filter media body surrounds said intake end, to a circulation passage discharge end, said intake end and said discharge end being disposed between said first end and said second end of said filter media body, said circulation passage means for providing communication between an interior of said filter media body adjacent said first end of said filter media body and an interior of said filter media body adjacent said second end of said filter media body; and,
    sewage current generating means for generating flow current within said circulation passage means for breaking individual ones of said filter media from said interior of said filter media body adjacent said intake end and not disturbing a remainder of said filter media body so as to maintain individual filter media of said remainder of said filter body in a substantially static state with respect to adjacent filter media and propelling said individual ones of said filter media from said intake end of said circulation passage means to said discharge end of said circulation passage means and for urging said one of said filter media into engagement with said interior of said filter media body adjacent said second end of said filter media body.

3. A circulating flow type sewage disposal apparatus according to claim 2 wherein said circulation means extends horizontally and is defined by a plurality of partition walls set in the septic tank, and sewage current reverse to the flowing direction of the sewage are formed in the circulation means.

4. A circulating filter type sewage disposal apparatus according to claim 3, wherein said circulation passage means is a single circulation passage formed in the central portion of the interior of the septic tank.

5. A circulating filter type sewage disposal apparatus, comprising:
    means defining a septic tank including a sewage inflow connection for directing sewage into the septic tank and an outflow connection;
    partition wall means positioned within said septic tank, said partition wall means having openings allowing sewage to flow there through, said openings having an opening dimension preventing elements larger than said opening dimension from flowing through;
    a group of buoyant large filter media, larger than said opening dimension each of said filter media being in contact with adjacent filter media to form a filter media body on one side of said partition wall means;

circulation passage means extending through said filter media body from a circulation passage intake end wherein said filter media body surrounds said intake end, to a circulation passage discharge end, said intake end being disposed above a lower part of said filter media body and said discharge end being disposed below an upper part of said filter media body wherein said filter media body surrounds said intake end for providing communication between an interior of said filter media body adjacent one end of said filter media body and an interior of said filter media body adjacent another end of said filter media body; and, sewage current generating means for generating flow current within said circulation passage means for breaking individual ones of said filter media from said interior of said filter media body adjacent said intake end and not disturbing a remainder of said filter media body so as to maintain individual filter media of said remainder of said filter body in a substantially static state with respect to adjacent filter media and propelling said individual ones of said filter media from said intake end of said circulation passage means to said discharge end of said circulation passage means and for urging said one of said filter media into engagement with said interior of said filter media body adjacent said another end of said filter media body.

6. A circulating filter type sewage disposal apparatus according to claim 5, wherein said means defining the circulation passage means is a tubular member having opposite open ends defining a vertical circulation passage.

7. A circulating filter type sewage disposal apparatus according to claim 6, wherein said sewage current generating means includes air supply means for directing air bubbles through the lower end of said circulation passage such that bubbles flow thorough the circulation passage, generating sewage currents by their buoyancy.

8. A circulating filter type sewage disposal apparatus according to claim 5, wherein a sludge settling pit is defined below the circulation means.

9. A circulating filter type sewage disposal apparatus according to claim 8, wherein said circulating passage means is a pair of circulation passages formed along the opposite side walls, respectively, of the septic tank.

10. A circulating filter type sewage disposal apparatus according to claim 4 or 9, wherein a vibrating means for vibrating the filter media is provided in the circulation passage means, pit means for settling sludge is provided at a predetermined distance in the downstream from the vibrating means.

11. A circulating filter type sewage disposal apparatus according to claim 5, wherein said circulating passage extends vertically within said filter body from adjacent a top of said filter body at a surface of said sewage to a location adjacent a bottom of said filter body.

12. A circulating filter type sewage disposal apparatus according to claim 5, wherein said circulating passage means extends horizontally, between a location adjacent a sewage outflow end of said filter body to a location adjacent a sewage inflow end of said filter body.

13. A circulating filter type sewage disposal apparatus according to claim 5, wherein said sewage current generating means vibrates said individual ones of said filter media to remove material from said individuals one of said filter media as said individual ones of said filter media is moved from said intake end to said discharge end of said circulating passage means.

* * * * *